United States Patent [19]
Fowler

[11] Patent Number: 6,108,011
[45] Date of Patent: *Aug. 22, 2000

[54] SHAPE INTERPOLATION FOR COMPUTER-GENERATED GEOMETRIC MODELS USING INDEPENDENT SHAPE PARAMETERS FOR PARAMETRIC SHAPE INTERPOLATION CURVES

[75] Inventor: Barry M. Fowler, Santa Cruz, Calif.

[73] Assignee: Pacific Data Images, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/740,359

[22] Filed: Oct. 28, 1996

[51] Int. Cl.$^7$ ..................................................... G06T 11/00
[52] U.S. Cl. ............................................ 345/441; 345/474
[58] Field of Search .................................. 345/475, 441, 345/474

[56] References Cited

U.S. PATENT DOCUMENTS 5,594,852  1/1997  Tankelevich ........................... 395/141
5,594,853  1/1997  Salesin et al. ......................... 395/141
5,767,861  6/1998  Kimura .................................. 345/474

OTHER PUBLICATIONS

Kochanek, Doris H.U. and Bartels, Richard H., "Interpolating Splines with Local Tension, Continuity, and Bias Control" Computer Graphics, vol. 18, No. 3, pp. 33–41, Jul., 1984.

Foley, James D., Dam, Andries van, Feiner, Steven K., Hughes, John F., Computer Graphics Principles and Practice, 2nd Ed., pp. 504–507, 514–516, 1990.

*Primary Examiner*—Mark K. Zimmerman
*Assistant Examiner*—Huedung X. Cao
*Attorney, Agent, or Firm*—Fenwick & West LLP

[57] ABSTRACT

A method, apparatus, and software product interpolates inbetween shapes of a two- or three-dimensional geometric model between a sequence of key poses of the model using a new type of parametric curve with shape parameters for providing independent control over the properties of the curve. The shape parameters provide the animator with full control over the behavior of the interpolated shapes between one key pose to the next. More specifically, these shape parameters independently control the direction, absolute magnitudes, and relative magnitudes of the incoming and outgoing tangent vectors at each key pose.

12 Claims, 10 Drawing Sheets

SHAPE INTERPOLATION FOR COMPUTER-GENERATED GEOMETRIC MODELS USING INDEPENDENT SHAPE PARAMETERS FOR PARAMETRIC SHAPE INTERPOLATION CURVES

BACKGROUND

1. Field of the Invention

The present invention relates generally to methods, apparatuses, and software products for processing images, and more particularly to computer-implemented methods and software products for interpolating shapes between key posed shapes of a two- or three-dimensional geometric model.

2. Description of the Background Art

In computer graphics technology, a two- or three-dimensional geometric model is a self-contained object or entity that can be represented by a connected set of points. A geometric model can be a simple structure such as a circle or sphere, or can be something much more complex, such as an animal's body. A model is set up so that it can be manipulated into different shapes. A shape is used as a pose of the model at a specific time during a computer-animated sequence.

One way for a computer animator to animate the movement of a geometric model from one position to another is to put the model into a start pose, store it, put the model into a pose slightly closer to the final pose, store it, put it into a pose slightly closer to the final pose, store it, and so on, until the final pose is reached. The model's movement is animated when the poses are quickly replayed in succession. The process of creating all the separate poses is very tedious and inefficient, as it is equivalent to drawing separate frames one at a time using traditional animation tools.

A much faster and more effective way to animate a model's movement is for the animator to first prepare a "library" of different shapes of the model to be used in the animation, then pick the appropriate shapes from this shape library to create a series of "key" poses (often simply referred to as "keys") to appear at specific times. The computer graphics hardware and software is then employed to interpolate the shapes between the key poses (often referred to as "inbetween shapes," or more simply, "inbetween"). For example, to animate a hand waving from left to right, the animator sets two key poses of the hand, one key pose at the left position and one key pose at the right position. The computer then interpolates the intermediate shapes of the hand moving across from left to center to right.

This process of specifying sets of data at specific times and using the computer to generate the inbetween data is a fundamental procedure in computer animation known as "key-frame interpolation." Key-frame interpolation is most often applied to sets of data that are single valued, such as a particular angle of rotation, or points in two- or three-dimensions. A more specific application, where the data posed and interpolated is a set of two- or three-dimensional geometric models is commonly referred to as "shape interpolation."

In order to interpolate the shapes between the key poses of a model, there needs to be a way to specify the influence of the key poses on the inbetween shapes. This is most often done implicitly by using a particular type of parametric interpolation curve, where, in this case, the parameter is time. Each inbetween shape can be considered analogous to a sample point on an interpolation curve. Just as the sample point in the curve can be computed as a weighted combination of the key points defining the curve, so can the inbetween shape be computed as a weighted combination of the key poses. The amounts of these weights for each inbetween shape and the way in which the weights vary depend on the type of curve used. For example, using a linear curve between two key poses defines the inbetween shapes in terms of only two key poses: the poses before and after (in terms of time) the desired inbetween shape. Since a linear curve does not provide a "smooth" interpolation, it is common practice in computer graphics and other applications to use parametric cubic curves to interpolate inbetween shapes. This means that four points contribute to each inbetween shape: the two poses before and the two poses after the inbetween. The way in which these four key poses influence a particular inbetween shape depends on the type of parametric cubic curve employed.

Several curve types are used in the more general process of key-frame interpolation of single values or points in two or three dimensions, but not all of these types are applicable to the particular problems of shape interpolation. In key-frame interpolation, Bezier curves are a popular choice because they interpolate between the key data and provide two additional sets of data with which to change the affects on the inbetween data. These additional points (or "handles") are not interpolated, but provide particularly intuitive control of two- or three-dimensional curves. For single-valued or point data, this is an effective and intuitive technique for interpolating single values or points.

However, Bezier curves are not suitable for shape interpolation because the two additional "handle shapes" must be copies of the entire geometric model, requiring considerable extra data storage for many complex models. Second, since these handles are shapes which are never interpolated, the animator must painstakingly position a complex geometric model into a pose that is never desired as part of the final animation but has the indirect effect on the inbetween shapes. These poses may have to be repeatedly adjusted to achieve the correct inbetween shapes. The space required to store these handle shapes, the difficulty of the general process of shaping a geometric model, and the lack of intuitive control that this offers all make Bezier curves unsuitable for shape interpolation.

The more commonly used curve types for shape interpolation are those for which all key poses are interpolated and no other poses are necessary to define the inbetween shapes. For a curve type to meet these requirements would seem to give it little flexibility, and this is often the case. Given a set of key poses and an interpolation curve to generate the inbetween shapes, if a sequence of the inbetween shapes is not desirable, there are no additional controls to affect the inbetween shapes without changing the key poses themselves, which again requires extensive effort by the animator. For example, in FIG. 1A, there is shown a position over time graph of key poses $P_0$–$P_3$ of a point at times $t_0$ to $t_3$. The desired path of interpolation is a straight line 110 between $t_1$ and $t_2$. However, with a conventional interpolation curve defined at points $P_0$ through $P_3$, the curve overshoots 100, such that the interpolated points are above the existing key points and the desired path 110.

Because overshoots are undesirable in key-frame and shape interpolation, the common workaround is to introduce another key pose between two existing keys to guide the inbetween shapes in the more desired direction along line 110. This workaround is illustrated in FIG. 1B, where another key pose P* is added between $P_1$ and $P_2$. The introduction of P* reduces the overshoot 100 demonstrated in FIG. 1A, but smaller overshoots 100 (FIG. 1B) in the intervals between $P_1$ and P*, and P* and $P_2$ still occur, here producing an even less desirable result in terms of the smoothness of the interpolated path: an animated object moving across the screen between points P1 and P2 would zigzag through P* instead of moving in a straight-line or smooth curve. If this workaround was not required very often it would be an acceptable solution, but experience has shown that many additional key poses are often necessary to achieve the desired inbetween shapes, which leads back to the space and labor requirements of shaping and storing many additional poses.

One way of dealing with this problem in conventional animation systems provides the animator with curves for each point in the model in order to adjust the inbetween shapes. This trades off the space and labor requirements of generating additional poses with that of creating as many curves as there are points in the model (often many thousands) and requiring the animator to select and adjust those that are necessary, which is likely to a be large portion, if not all such curves. This alternative approach provides no savings in computer memory since a curve must be defined for each point of the model, or human labor, since so many curves have to be manually adjusted.

Another way of dealing with this problem takes away the specification of a particular curve type through the poses and allows the animator to specify weighting curves for each pose. The animator is presented with a timeline and a set of curves for each key pose that define the contribution of each pose to the inbetween shapes. The contribution of each pose is defined by a weight, and each inbetween shape is the weighted sum of the key poses, adjusted for the relative time of the inbetween shape to the key poses. This has proven to be an awkward interface for animators since it provides a very mathematical interface to solving the problem. If a mathematician was to plot the weighting curves for each pose that result from a standard interpolation scheme, it turns out that many poses actually have negative contributions to some inbetween shapes, which is not an intuitively obvious result. This lack of intuition makes this an ineffective interface for animators to use to graphically define the weighting curves.

A variety of additional curve types have been developed for use in key-frame interpolation that offer additional shaping control at each key frame or point. This control is often presented in the form of local shape parameters, which are sets of one or more values specified at each key that affect the shape of the curves on either side of each key point. Such curve types have a default set of values that yield a familiar interpolation curve, such as a Catmull-Rom spline, and therefore provide additional control to complement a familiar result. Although not used in shape interpolation, their advantage in this application lies in the fact that the shape parameters usually consist of one to three values that can be applied to data or shapes with an arbitrary number of dimensions, unlike Bezier curves where the handles must be of the same dimension as the data being interpolated.

Conventional interpolation curves using shape parameters attempt to offer intuitive control of the curve by affecting properties of the tangent vectors at the key frames or points. At a given key there are considered to be two tangent vectors to the curve: one "incoming" vector that approaches from the previous key and a second "outgoing" vector that departs towards the next key. The properties of these vectors that are most desirable to control at these points are their common direction, their absolute magnitudes and their relative magnitudes. These properties of the tangent vectors at a key are determined by a relationship between the key itself and the previous and next key. The Catmull-Rom spline, for example, ignores the position of the key itself and defines the tangents as the vector between the previous and next key. These vectors are not explicitly derived but are achieved through the mathematical formulation of the curve types.

The shape parameters offer additional freedom in these formulations of how the properties of the tangent vectors are controlled. A common shape parameter is named "tension" and controls the magnitude of both of the tangent vectors. In some cases, however, the conventional tension parameter also simultaneously alters the direction of the tangent vectors. A less common shape parameter is given the name "bias" and may control the relative magnitudes of these vectors, their direction, or both at once, depending on the curve type. Shape parameters that affect more than one of these properties at once are considered non-intuitive to animators, because in attempting to change one property, such as the magnitude of the tangent vectors, the conventional shape parameter will alter another property, such as the direction, producing a different result than intended by the animator. No existing curve type provides both isolated and intuitive control of these three properties.

The shortcomings of the existing shape interpolation techniques make it is difficult and time consuming for the computer animator to control the interpolated shapes between the key poses. Existing techniques for affecting the inbetween shapes involve either adding and reshaping many new poses or individually editing the hundreds or thousands of curves through each key point in the sequence of poses. These techniques are expensive in terms of data storage and manipulation time. Other techniques developed to avoid these expenses are not intuitive to the animators. Thus, there is a need for an improved method for shape interpolation that overcomes the disadvantages of the conventional techniques. Because the need for shape interpolations between key poses in geometric models is commonly experienced in the computer animation, it is desirable to provide a simplified technique with a small and independent set of shape parameters to control the form of the curve on which the interpolation is based, without the need to modify existing modeling and animation tools.

SUMMARY OF THE INVENTION

In accordance with the present invention, methods, apparatuses, and software products are provided to interpolate two- or three-dimensional geometric model shapes using shape parameters for parametric interpolation curves that independently control the direction, absolute magnitude, and relative magnitude of the tangent vectors to key poses. The shape parameters for several key poses are then used to interpolate the inbetween shapes, without introducing the problems of overshoot, as described above.

The present invention is embodied in a software product, herein called a shape interpolator, used in conjunction with a digital computer with graphics display to interpolate the shapes between time-dependent key poses of a geometric model using independent shape parameters defined for each key pose. Once the key poses over time are established, the inbetween shapes are generated by a shape interpolation process executed by the shape interpolator.

The method in which the shape interpolator determines the inbetween shapes from a one key pose to the next is similar to a cubic interpolation curve connecting the points made up by the key poses and times $(P_i, t_i)$. The present invention provides a new type of interpolation curve. This new curve type uses three independent shape parameters that offer shaping control at each key pose, thereby affecting the shape of the curves on either side of each key. These shape parameters, herein named "balance," "tension," and "bias," provide completely independent control of the direction, relative magnitudes, and absolute magnitudes, respectively, of the incoming and outgoing tangent vectors at a given key pose $P_i$. The parameters describe the trajectory of an interpolation curve into and out of the key pose. Because these parameters are independent of each other, they each affect a property of the tangents without adversely affecting any of the other properties. Default values for the shape parameters, which are initially automatically assigned by the shape interpolator, may be used to yield the conventional Catmull-Rom interpolation curve, or modified to produce an effectively infinite number of interpolation curves through a given set of points.

In FIG. 1C, the affect of the balance parameter on interpolated poses is illustrated with respect to the problems of conventional interpolation curves as in FIG. 1A. Referring again to FIG. 1A, there is shown a conventional Catmull-Rom interpolation curve 116 formed between key points $(P_0,t_0)$, $(P_1,t_1)$, $(P_2,t_2)$, and $(P_3,t_3)$. The individual dots are the interpolated points. This curve contains undesirable overshoots 100 (where the interpolated points between the keys $P_1$ and $P_2$ have values higher than those keys). The tangent vectors 112 at the key $P_1$ and $P_2$ are shown as the dashed arrow lines. Because the Catmull-Rom spline provides not means of independently adjusting the direction of the tangent is vectors, the interpolated points follow the direction of these vectors.

FIG. 1C demonstrates, by modifying the balance parameter values at keys $P_1$ and $P_2$, how the overshoots in the interpolated points between $P_1$ and $P_2$ are eliminated, without the need to modify existing key poses or input additional key poses. The tangent vectors 114 are now shown as the dark arrow lines, along with the balance parameter values 118. Here, as key $P_1$ the balance has a value of 1.0, changing the direction of the outbound tangent vector to be pointing directly at the next key $P_2$. Likewise, the balance parameter at key $P_2$ is −1.0, directing the inbound tangent vector back to $P_1$.

In FIGS. 2A, 2B, and 2C, there is shown a situation where an isolated bias control is necessary to adequately control another type of overshoot. FIG. 2A shows the interpolation curve formed between key points $(P_0,t_0)$, $(P_1,t_1)$, $(P_2,t_2)$, and $(P_3,t_3)$ again using a Catmull-Rom spline curve 200. Note the very sharp transition in the curve through point $P_1$. FIG. 2B shows corrections to the curve by adjusting the balance and tension values—the balance changes the direction at the key point and the tension widens the approach to the key point. Note the "S" shaped curve between $P_1$ and $P_2$. The "BTB" notation are the values for bias, tension, and balance, respectively. Increasing the tension parameter at $P_1$ to 2.5 points the tangent vectors 220a, 220b toward the next point, thereby widening the approach from $P_0$. Here, the bias parameter (relative magnitude) is 0.0 so the inbound 220a and outbound 220b tangent vectors at each point have equal lengths.

In FIG. 2C, the bias value is adjusted to reduce the magnitudes of the tangent vectors at the ends of the segment between $P_1$ and $P_2$ In this case, an adjustment to the bias value is necessary to achieve an acceptable result. Changing the bias for the tangent vectors at $P_1$ to −0.6 changes the relative magnitude of the vectors, as shown by the greater length of the inbound tangent vector 230a to the outbound tangent vector 230b. This intuitively increase the impact of inbound tangent vector 230a, further widening the curve entering at $P_1$. To further smooth the curve into $P_2$, the bias of 0.7 at $P_2$ increases the relative magnitude of the outbound tangent vector 240b relative to the inbound tangent vector 240a. As can be readily deduced from these examples, only three shape parameters are needed to provide an extremely large variety of different curves to be defined through a set of points. Thus the three independent shape parameters of the present invention allow the animator to very easily and intuitively control the shape interpolation between key poses of complex geometrical models.

The independent affects of the shape parameters on a point animated over time are further illustrated in FIG. 3. There is shown in graphs 3(a) through 3(o) the independent effects of the balance, tension, and bias parameters on the vectors tangent to key point $P_1$ at time $t_1$, and how the changes to the parameters affects the tangent vectors and the inbetween points between the points $P_0$, $P_1$, and $P_2$, at times $t_0$, $t_1$, and $t_2$, respectively.

In 3(a) through 3(e), the balance parameter changes the direction of the tangents, with the balance of −1.0 directing the tangents away from the previous key, a balance of 0.0 being neutral between the key poses, and a balance of 1.0 directing the tangents towards the next key.

In 3(f) through 3(j), the tension parameter acts as a scaling factor on the magnitudes of the tangent vectors. A lower bound of 0 scales the tangent vectors to zero, creating a linear approach to and departure from the key point, while higher values scale the tangent vectors larger and larger to create a wider approach to the key point. Any useful upper bound may be established.

In 3(k) through 3(o), the bias parameter reduce the magnitude of the tangent on one side of the key point while increasing the magnitude of the is. tangent on the other side. A bias of −1.0 fully weights the inbound tangent vector fully and reduces the relative magnitude of the outbound vector to 0. A bias of 0.0 produces equal magnitude vectors, and a bias of 1.0 produces a fully weighted outbound tangent vector. As can be seen from the plots, each of the shape parameters independently influences the interpolation curve.

The affects of these shape parameters on a simple animated sequence for a shape are illustrated in FIGS. 4A, 4B, and 4C. In each figure, there is shown the variations in one parameter, FIG. 4A illustrating balance, FIG. 4B tension, and FIG. 4C bias. Each row shows the interpolation of a shape, here the interpolation of a triangle through a dodecagon and back to a triangle, for a selected value of the parameter. In each row, the first, fourth, and seventh shape are the key shapes $P_0$, $P_1$, and $P_2$ or poses, respectively, provided by the animator. Note that the key shapes are the same for all rows of the figures. The remaining shapes in each row are interpolated by the shape interpolator given the parameter value.

Thus, in FIG. 4A, items 1(a) through 1(g) show the in terpolation of a triangle using a balance parameter of −1.0. This value strongly weights the interpolated shapes toward the shape of the previous key shape. Accordingly, the shapes in 1(b) and 1(c) are more triangular in that order, while the shapes in 1(e) and 1(f) are more like the dodecagon. In row three, the balance is 0.0 and the shapes in 3(c) is the same as the same in 3(c). In row 5, the balance is 1.0, weighting the shapes toward the next key shape, thus making 5(c) more dodecagonal, and 5(e) more triangular.

In FIG. 4B there is shown the various interpolations using the tension parameter. As can be seen, tension influences how strongly the inbetween shapes are influenced by a given key pose. In 1(a) through 1(f) of FIG. 4B, the tension is 0.0 and the inbetween shapes are not strongly influenced by the key pose at 1(d). In 5(a) through 5(f), where the tension is 2.0, the inbetween shapes are very strongly influenced by the dodecagon at 5(d).

FIG. 4C shows the variations in shape interpolation using the bias parameter.

In one embodiment of the invention, after the key poses over time are established and the inbetween shapes are generated by the shape interpoltor, the animator reviews the sequence of key poses and interpolated shapes using conventional frame-by-frame computer animation techniques to verify that the interpolated shapes behave as desired. The animator may beneficially alter the inbetween shapes by modifying the shape parameters at particular key poses, then reinterpolating the sequence and review the new results.

The present invention thus provides animators with an intuitive and simple interface for defining the shape interpolation curves through a set of key poses of shapes of the geometric model. The invention quickly and interactively interpolates shapes between the input key poses.

The present invention also overcomes the problems of conventional interpolation techniques of being memory intensive. Instead of having to define either a large number of key poses, or else an interpolation curve for most (if not all) points of the model, the present invention allow the animator to define just three shape parameters for each key pose, regardless of the number of points in the geometrical model underlying the pose. This produces considerable memory savings, since the entire shape need not be duplicated for "handle shapes" or to curves stored for each point, and labor savings, since only three shape parameters are used for each key pose, regardless of its complexity.

The present invention also overcomes previous limits on the level of control the animator has on the behavior of the inbetween shapes. With the three independent controls on the interpolation curve, the animator can precisely define the inbetween shapes with introducing overshoot or other artifacts. The present invention thereby provides a method and software product that interpolates the shapes between key poses of two- or three-dimensional geometric models thereof suitable for use in computer graphics modeling, rendering, and animation, through a substantially automated and economical process.

DETAILED DESCRIPTION OF THE PREFERRED EMBODIMENT

Figure 5:
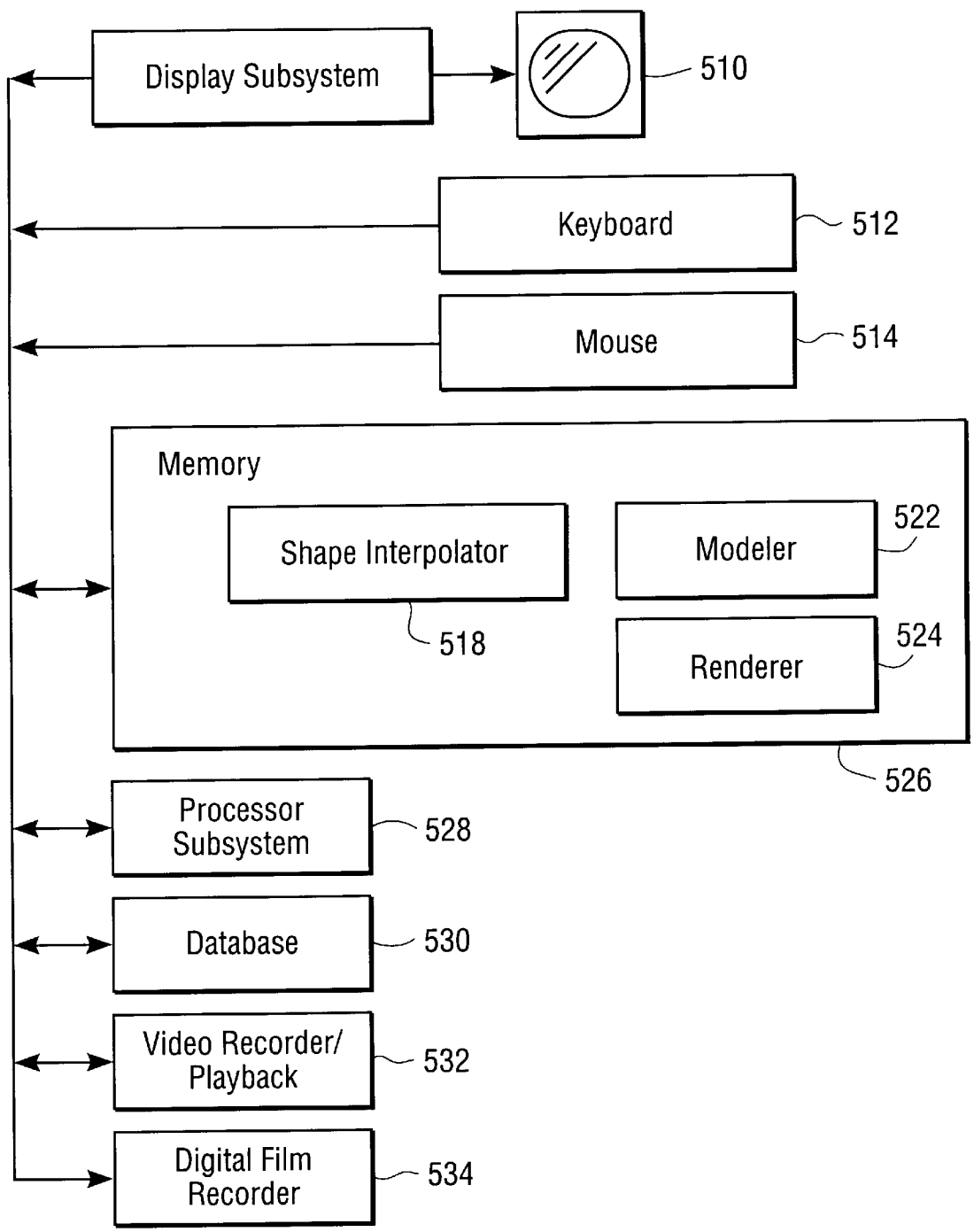
FIG. 5 is a block diagram of an apparatus in accordance with an embodiment of the invention, and which can be used to practice the method of the present invention.

Referring to FIG. 5 there is shown a block diagram of an apparatus 500 in accordance with one embodiment of the present invention, and which can be used to practice the method of the present invention. Apparatus 500 comprises a computer system including a processor 528, a memory 526, input devices such as a keyboard 512 and mouse 514, and output devices such as a raster display 510, and optionally video recorder 532, digital film recorder 534, and the like for recording completed animations. The processor 528 and overall apparatus 500 operates under the control of software installed in memory 526. The display device 510 is used to monitor input and control of the process, and to view the key and interpolated shapes of a geometric model. Database storage 530 stores data defining key poses and interpolated shapes for the geometric model.

Memory 526 includes a shape interpolator 518, a software product for shape interpolation in accordance with one embodiment of the present invention. In one embodiment, the shape interpolator 518 is used to interpolate the shapes between key poses. The elements of the shape interpolator 518 variously configure and control the processor 528 to operate in accordance with the method of the present invention. The shape interpolator 518, or any elements thereof, may be supplied to the apparatus 500 on CD-ROM, diskette, or any other computer-readable media, for installation and execution thereon. The memory 526 may also include conventional software, such as a modeler 522 for creating and manipulating a two- or three-dimensional geometric model, or a renderer 524 for rendering images and associated data. The modeler 522 and renderer 524 may be conventional, or in an alternate embodiment, may be modified to incorporate the elements of the shape interpolator 518 itself. The computer system and apparatus may be implemented on a conventional Silicon Graphics workstation, executing the shape interpolator 518 in accordance with the present invention, or any other combination of software or hardware that performs the method of the present invention. It is understood by those of skill in the art of software engineering that the method of the present invention may be implemented in various configurations of a software product having different elements than those identified above.

Figure 6:
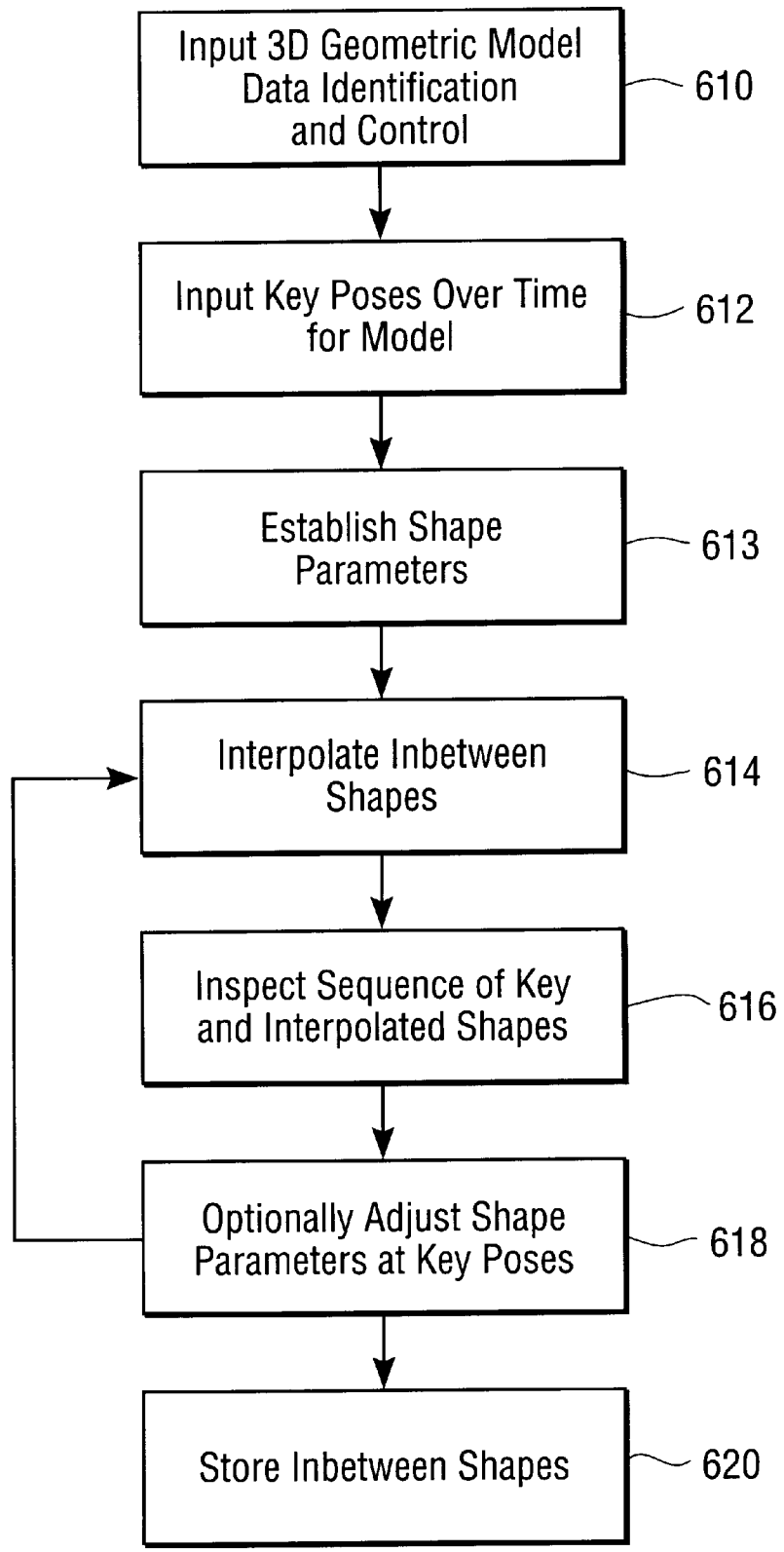
FIG. 6 is a flow diagram for a generalized procedure for interpolating shapes between key poses in accordance with the present invention.

Referring now to FIG. 6 there is shown a generalized flow diagram of a typical end user procedure for interpolating shapes between key poses in accordance with an embodiment of the invention. The geometric model is first created 610, using conventional modeling software 522. Any type of computer-generated model and modeling software may be used with one embodiment of the invention; the format of the model and the specifics of the modeling software is not material. Models suitable for use with the present invention include those generated in modeling and animation tools such as Alias/Wavefront's Studio™ or Power Animator™ and Microsoft Corp.'s SOFTIMAGE|3D™.

The animator also manipulates the model into different shapes and creates a library of shapes $S=\{S_0, \ldots, S_m\}$ to be used in the animation; the library of shapes is stored in database 530. In addition to creating the geometric model and shape library, the animator also specifies where the interpolated shapes output is to be stored 620 in the database 530.

Using input devices such as the mouse 514 and keyboard 512 and viewed on the display 510, the animator inputs 612 a sequence of key poses $P=\{P_0, \ldots, P_n\}$ of the model at times $T=\{t_0, \ldots, t_n\}$. The animator may select the key poses from the library of shapes S or employ the modeler 522 to create custom shapes, which may be added to the shape library as needed.

Shape parameters are established 613 for the shape interpolation. Preferrably, a default set of shape parameters is assigned to each of the key poses, either as the standard default values to yield the conventional Catmull-Rom interpolation curve or a set of values derived from heuristics that anticipate the animator's needs. The animator may also explicitly enter the shape parameters for each key pose.

Next, the shape interpolator 518 determines 614 the inbetween shapes using the key poses and the shape parameters for each key pose. The animator inspects 616 the full sequence of key poses and interpolated inbetween shapes. The animator may optionally modify the behavior of the interpolated shapes by modifying the shape parameters at the appropriate key poses 618 and then repeating steps 614 and 616.

Lastly, the interpolated shapes are stored 620 in database 530.

It is understood that variations of this procedure can be employed, consistent with the principles of the invention, depending upon the properties of the geometric model and the animator's preferences for the interpolated shapes output.

Referring to step 614 above, the inbetween shapes from a given key pose to the next key pose are similar to a cubic interpolation curve connecting the points made up by the key poses and times $(P_i, t_i)$. In one embodiment of the invention, a parametric interpolation curve is defined with three local shape parameters of balance, tension, and bias affecting the direction, absolute magnitude, and relative magnitudes of the tangent vectors at the key poses, respectively. Each parameter affects its associated property without adverse affects on the other properties. The shape parameters are specified once for each key pose, and thereby apply to all points of the geometrical model, thereby eliminating the need to store separate parameters with every point of the model, as in conventional interpolation systems.

Figure 1A:
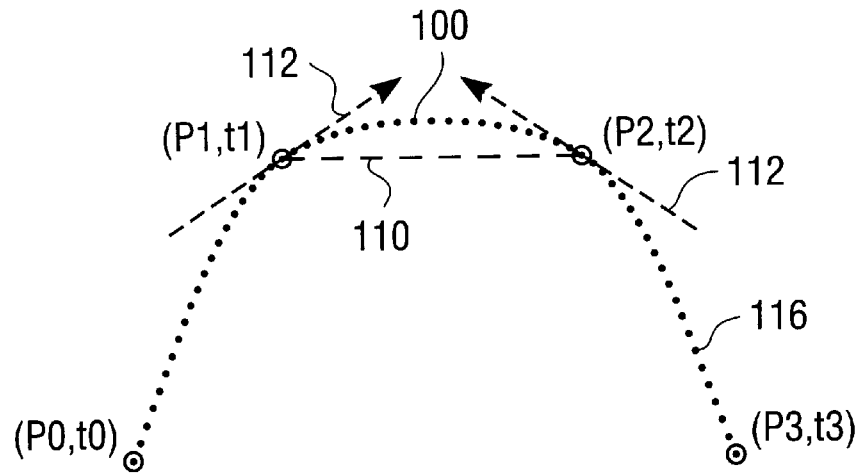
FIGS. 1A, 1B illustrate conventional interpolation techniques and a common type of overshoot in conventional interpolation curves.
Figure 1B:
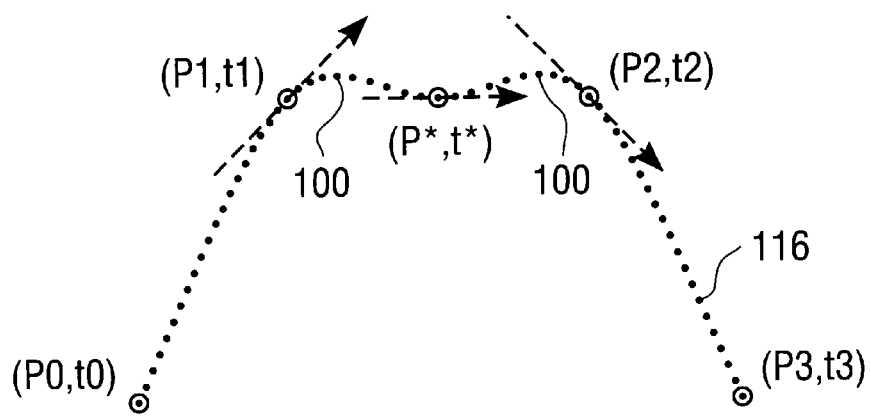
Figure 1C:
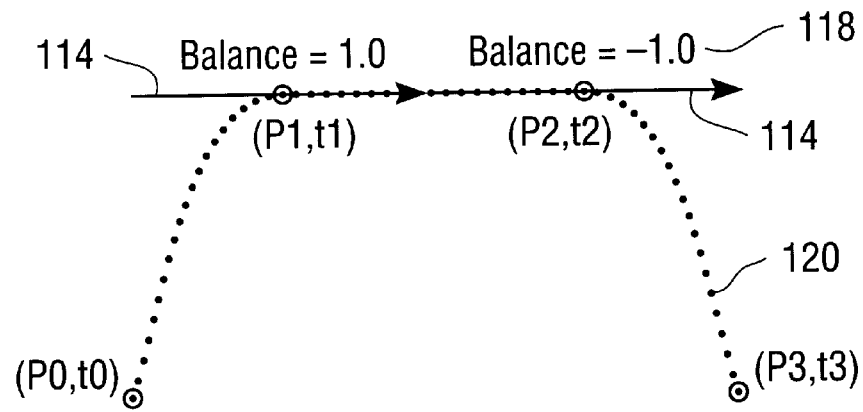
FIG. 1C illustrates the present invention's improvements over such conventional interpolation techniques in controlling overshoot.
Figure 2A:
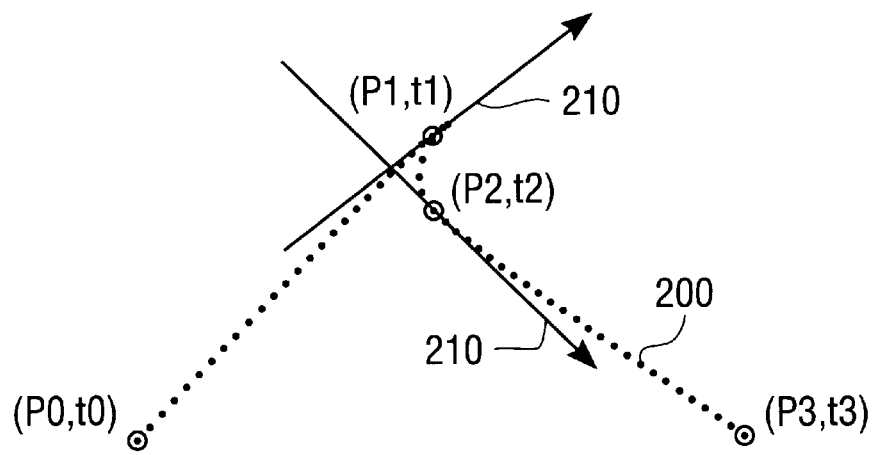
FIG. 2A illustrates a conventional interpolation curve with another type of overshoot in interpolation curves.
Figure 2B:
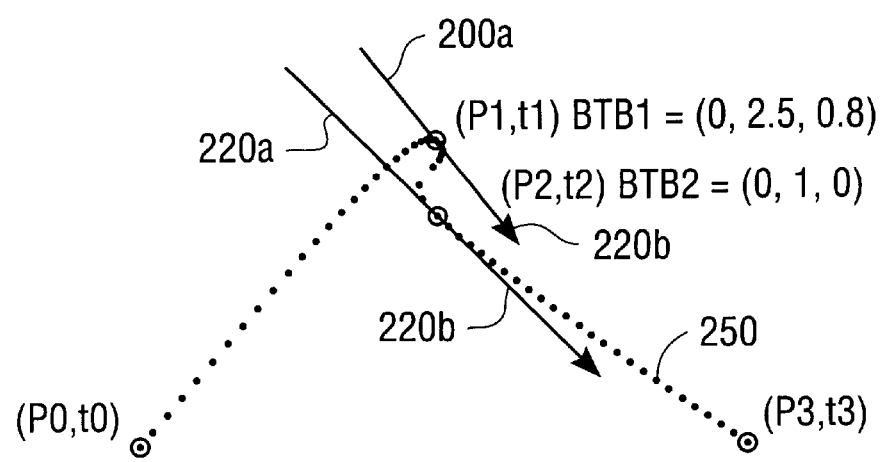
FIGS. 2B, and 2C illustrate the present invention's improvements over conventional techniques in controlling this type overshoot in shape interpolation curves.
Figure 2C:
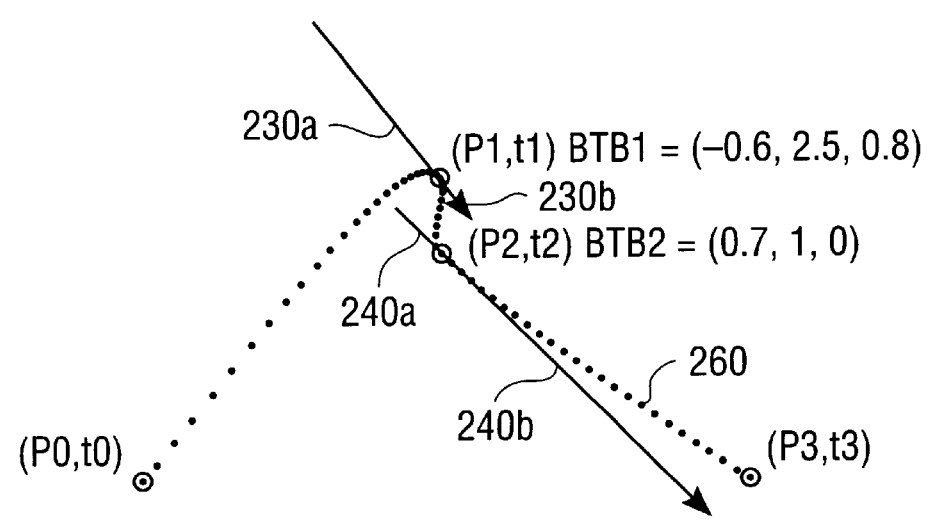
Figure 3:
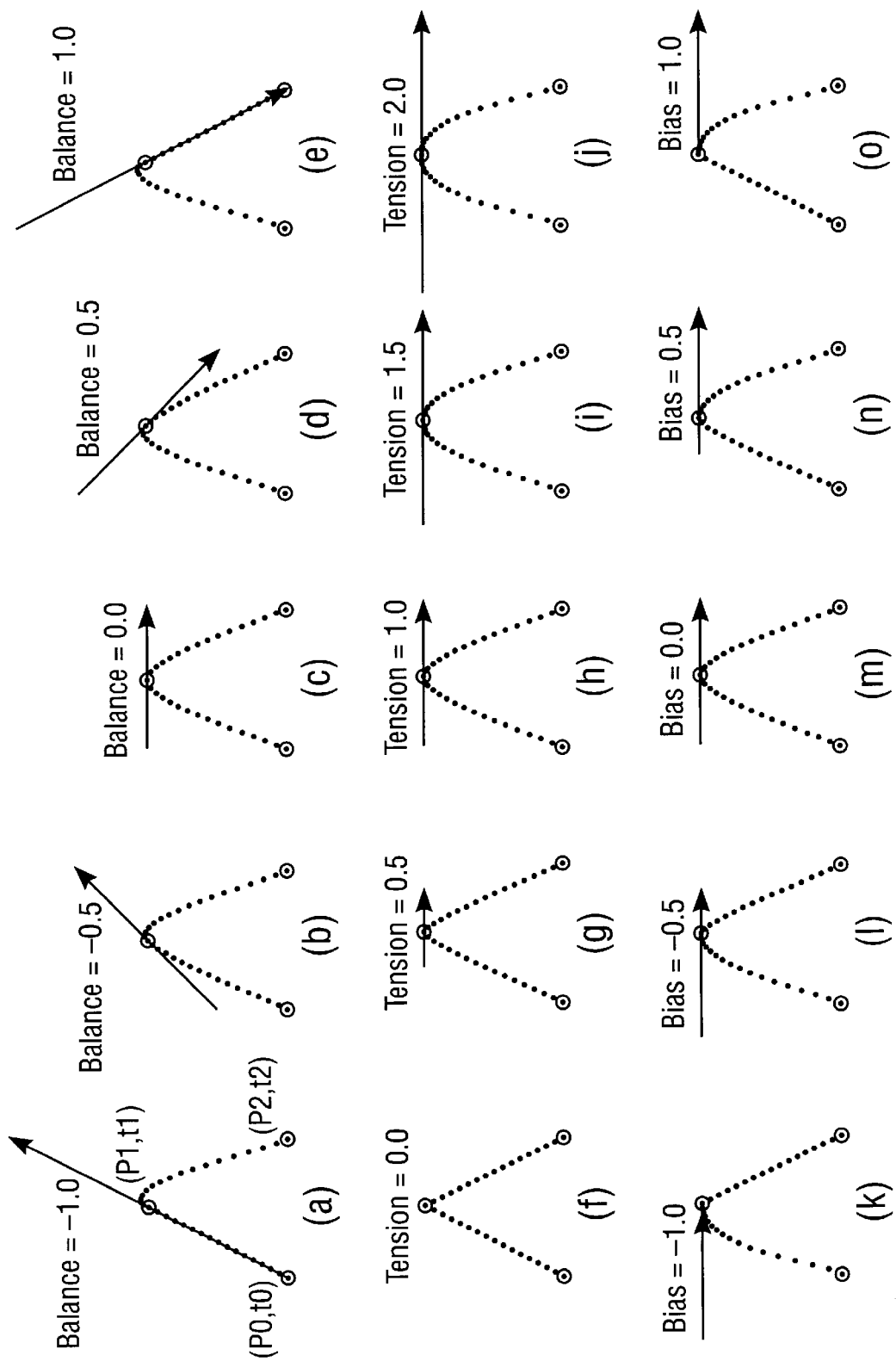
FIG. 3 illustrates the independent effects of the three shape parameters on the interpolated points between key points.
Figure 4A:
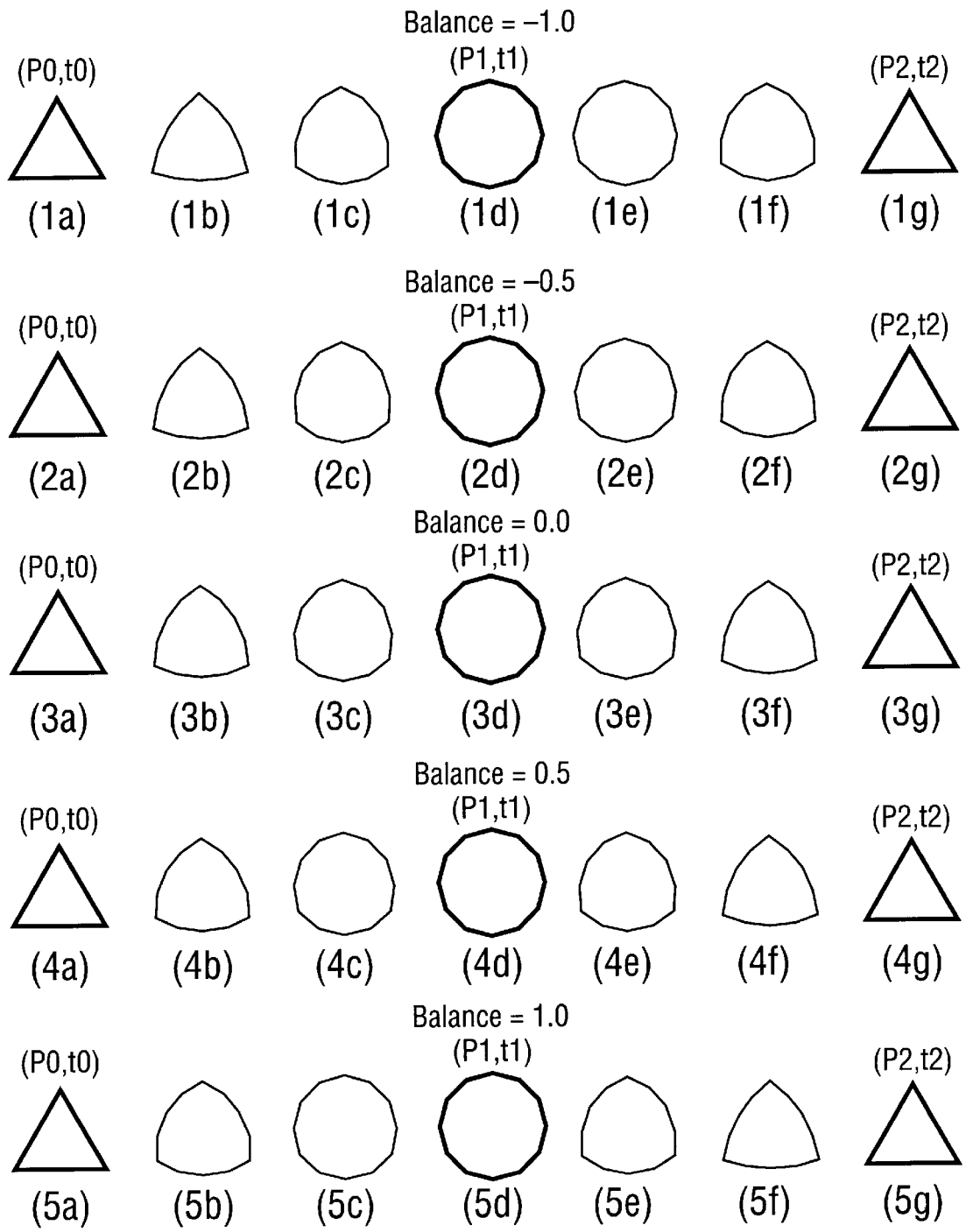
FIGS. 4A, 4B, and 4C illustrate the independent effects of each shape parameter on an animated sequence of key shapes and interpolated inbetween shapes.
Figure 4B:
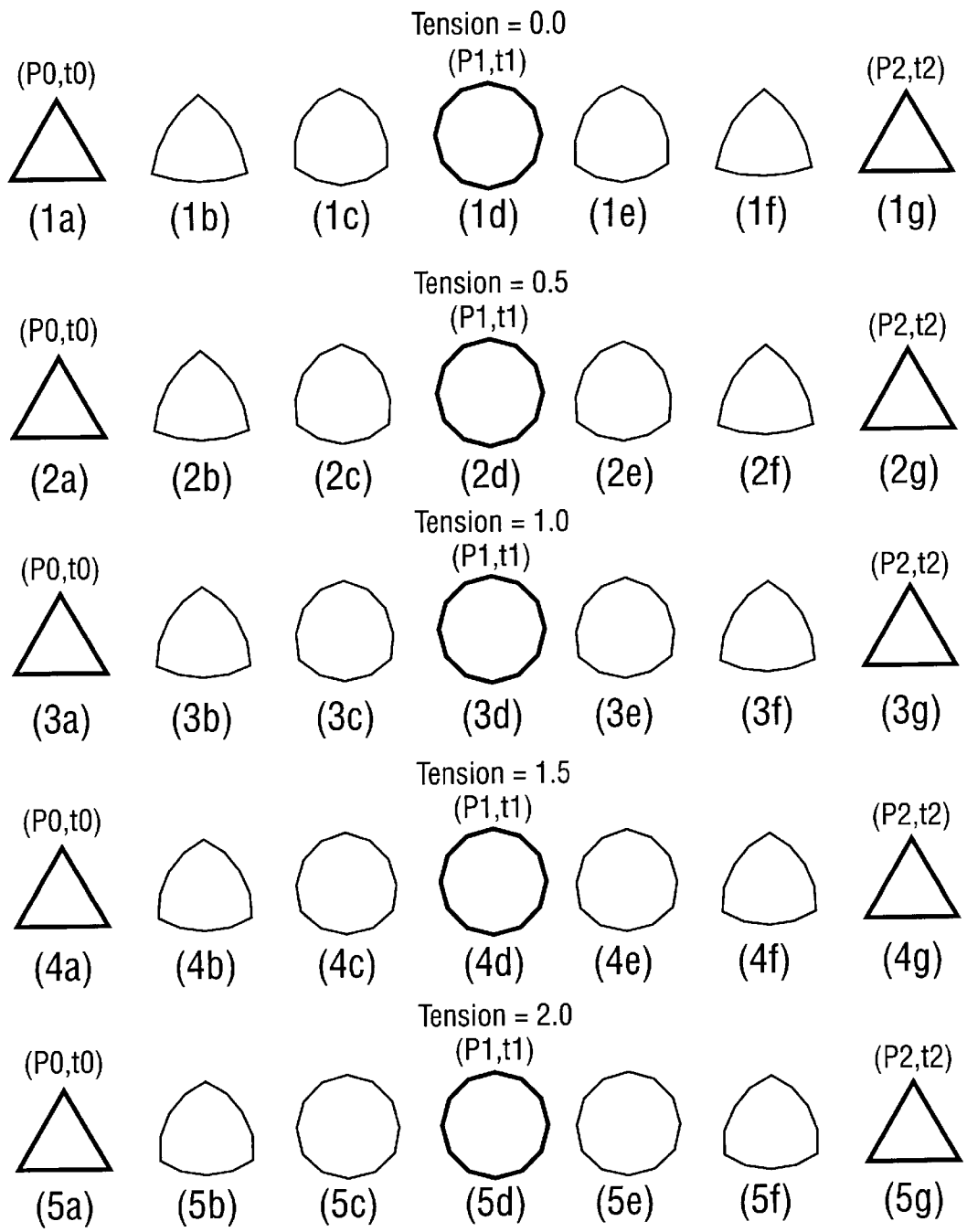
Figure 4C:
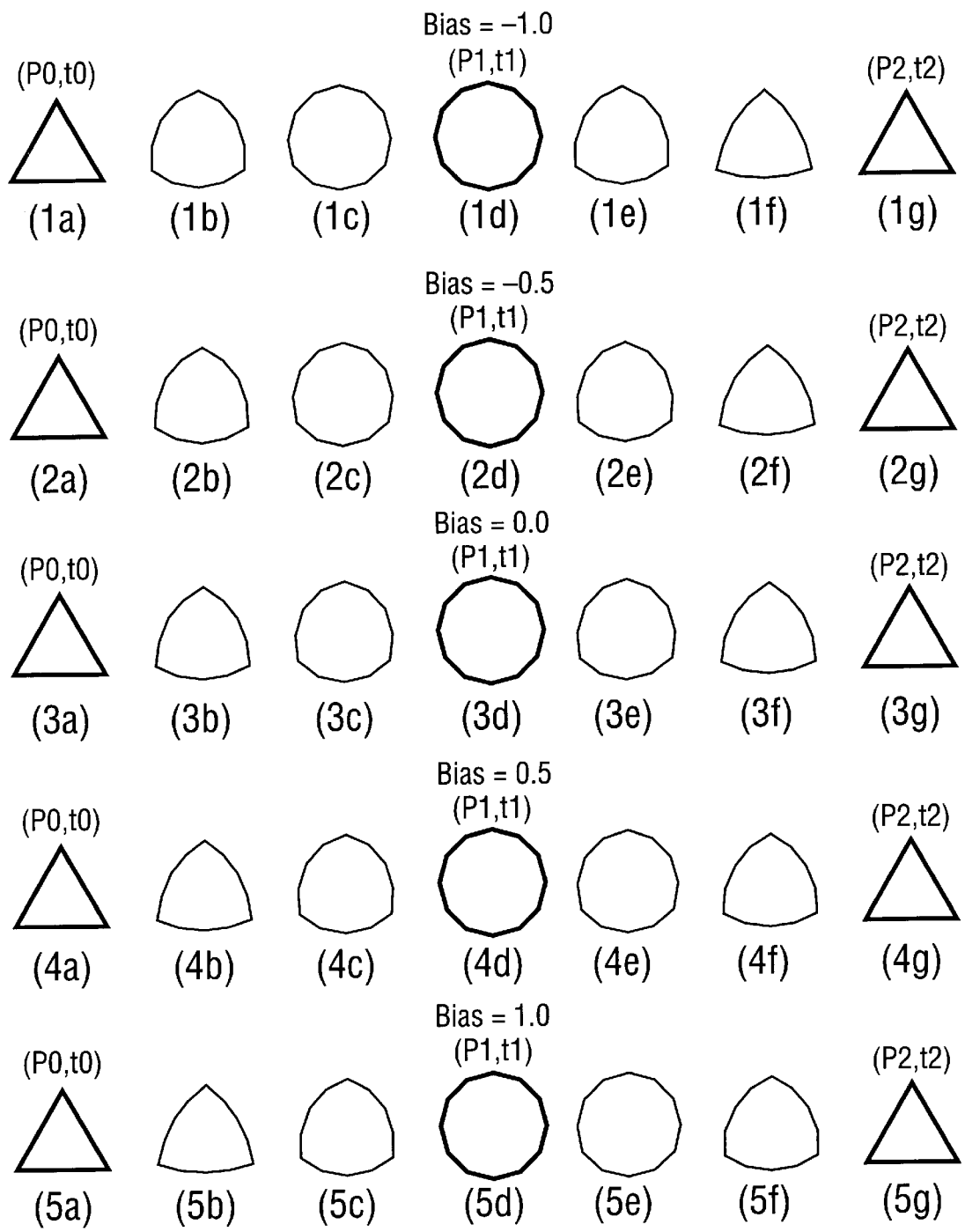

In one embodiment of the invention, the balance parameter has the range $-1 \leq$ Balance $\leq 1$ with default value 0; the tension parameter has the range $0 \leq$ Tension $\leq \infty$, with default value 1; and the bias parameter has the range $-1 \leq$ Bias $\leq 1$, with default value 0. These default values of the shape parameters yield the familiar Catmull-Rom interpolating curve. Other default values may also be used, as desired by the animator. The isolated affects of these parameters on a point animated over time are illustrated in FIG. 3, as described above. The isolate d affects of each of the shape parameters on the inbetween shapes in an animated sequence of shapes are illustrated in FIGS. 4A, 4B, and 4C, as described above.

Figure 7:
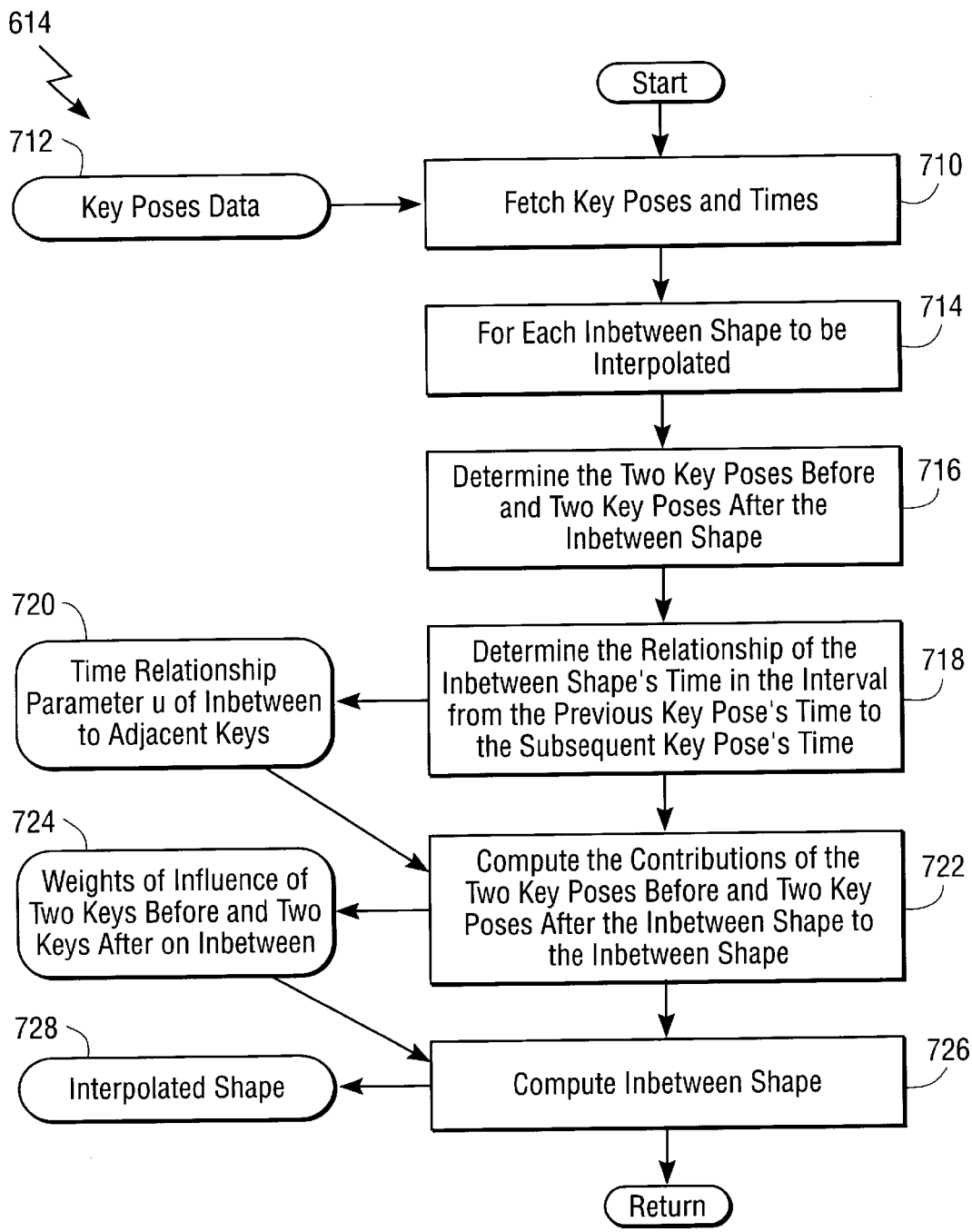
FIG. 7 is a flow diagram of the routine that determines the interpolated shapes.

Referring now to FIG. 7 there is shown a flow diagram for the operation of the shape interpolator 518 in interpolating the inbetween shapes between the key poses. The previously input key poses $P_i$ at times $t_i$ are retrieved 710 from the database 530. For an inbetween shape $S_t$ at time t to be interpolated 714, the shape interpolator 518 determines 716 the two key poses before and the two key poses after the inbetween shape $S_t$. This is a set of poses $Q=\{Q_0, Q_1, Q_2, Q_3\}$ where $Q_1=P_i$ and $Q_2=P_{i+1}$ such that $t_i<t<t_{i+1}$, making $Q_1$ and $Q_2$, the key poses at times $t_1$ and $t_2$ respectively, before and after the desired inbetween shape $S_t$. Note that $t_1$ and $t_2$ are reused for notational convenience, and unrelated to the times T for the key poses P, defined above. Therefore, $Q_0=P_{i-1}$ (or $Q_0=P_0$ if i=1), and $Q_3=P_{i+2}$ (or $Q_3=P_n$, if i=n-1). It should be noted that the number and choice of these poses is dependent on the representation of the curve used to provide the interpolation, but that this is the most common set used with cubic polynomial interpolants.

Next, the shape interpolator 518 determines 718 a time relationship parameter u (FIG. 7, 720) that defines the relationship an inbetween shape's time t in the interval between the previous key shape's time $t_1$ to the subsequent key shape's time $t_2$. This parameter $$u = \frac{t - t_1}{t_2 - t_1} \quad (1)$$

defines the relationship of t to the interval $(t_1, t_2)$. It should be noted, however, that it is common practice to obtain the parameter u by alternative, often more complex methods, to alter the timing of events that occur between $t_1$ and $t_2$.

The shape interpolator 518 computes 722 contributions to inbetween shape $S_t$ of the two key poses before ($Q_0$ and $Q_1$) and two key poses after ($Q_2$ and $Q_3$) inbetween shape $S_t$, using the shape parameters for $Q_1$ and $Q_2$ and the time relationship parameter u. In one embodiment of the shape interpolator 518, the contribution of the poses $Q=\{Q_0, Q_1, Q_2, Q_3\}$ to the desired shape $S_t$ is represented by the set of weights $W=\{w_0, w_1, w_2, w_3\}$. After these weights 724 are obtained, the desired inbetween shape $S_t$ is computed 726. In one embodiment, the computed desired shape $S_t$ is a weighted average of shapes $Q_0$, $Q_1$, $Q_2$, and $Q_3$, that is, $$S_t = w_0 * Q_0 + w_1 * Q_1 + w_2 * Q_2 + w_3 * Q_3 \quad (2)$$

and in which this simple weighted sum is applied to each dimension of each point in the model to determine the interpolated inbetween shape $S_t$ (FIG. 7, 728).

It should be noted that some conventional shape interpolation systems compute key pose contributions to the inbetween positions of every point in the model. This process is less efficient than the present invention because step 722 is much more complex than step 726, but is only performed once in the present invention, rather than on each and every point in the model as in conventional systems. In cases where a different curve is desired for different points in the shapes, 722 and 726 must be applied to these points in turn.

Figure 8:
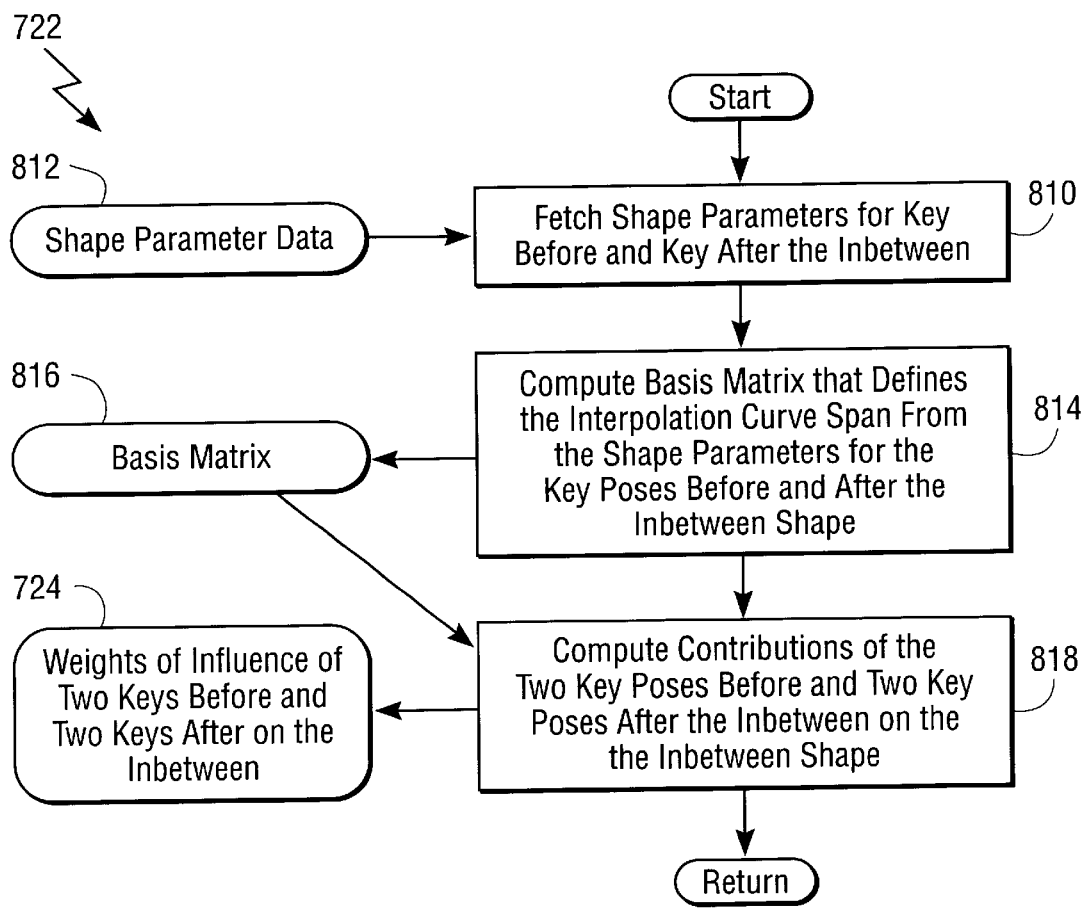
FIG. 8 is a flow diagram of the routine that calculates the contributions of the two key poses before and two key poses after the desired inbetween shape on the desired inbetween.

Referring now to FIG. 8, there is shown a flow diagram of the preferred embodiment in the shape interpolator 518 for computing 722 the contributions of key poses to an inbetween shape in FIG. 7. The procedure 722 for deriving formulas for computing the weights or contributions of the two key poses before ($Q_0$ and $Q_1$) and two key poses after ($Q_2$ and $Q_3$) to inbetween shape $S_t$ is similar for many types of interpolation and approximation curves. It is understood by practitioners familiar with the mathematical representations of curves that for specific representations there are more efficient methods for deriving the weights than the general method presented here, but that such alternatives are mathematically equivalent.

The weights of influence $W=\{w_0, w_1, w_2, w_3\}$ of the four key poses $Q=\{Q_0, Q_1, Q_2, Q_3\}$ are required to compute the pose $P_t$ at time t. These weights are computed using the parameter u (defining the location of time t with respect to the interval between poses $Q_1$ and $Q_2$) and the shape parameters $BTB_1$ at $Q_1$ and $BTB_2$ at $Q_2$, which are retrieved 810 from the database. In one embodiment of the shape interpolator 518, these shape parameters are denoted as $$BTB_1 = \{Bias_1, Tension_1, Balance_1\} \quad (3)$$

$$BTB_2 = \{Bias_2, Tension_2, Balance_2\}$$

The set of poses Q and the sets of shape parameters B T $B_1$ and B T $B_2$ mathematically define an interpolation sequence of any number of inbetween shapes between two poses. The parameter u defines the particular shape $S_t$ in this sequence.

A cubic polynomial function defining an interpolation curve can be written as $$f(u) = [u^3 \; u^2 \; u \; 1] * B * \begin{bmatrix} Q_0 \\ Q_1 \\ Q_2 \\ Q_3 \end{bmatrix} \quad (4)$$

where B is the 4×4 basis matrix defining the span between $Q_1$ and $Q_2$ (for brevity, $U=[u^3 \; u^2 \; u \; 1]$ will be substituted). This basis matrix B is computed 814, using the sets of shape parameters at $Q_1$ and $Q_2$, namely $BTB_1$ and $BTB_2$. Since $$f(u) = [w_0 \; w_1 \; w_2 \; w_3] * \begin{bmatrix} Q_0 \\ Q_1 \\ Q_2 \\ Q_3 \end{bmatrix} \quad (5)$$

is desired, it follows that $$[w_0 \; w_1 \; w_2 \; w_3] = [u^3 \; u^2 \; u \; 1] * B \quad (6)$$

which is used to compute the set of weights $\{w_0, w_1, w_2, w_3\}$.

The construction of B is illustrated with a relationship to the Hermite basis matrix H, which is familiar to those in computer graphics experienced with parametric curve representations. Every parametric cubic polynomial curve can be represented in Hermite form as $$f(u) = U * B * \begin{bmatrix} Q_0 \\ Q_1 \\ Q_2 \\ Q_3 \end{bmatrix} = U * H * \begin{bmatrix} Q_1 \\ Q_2 \\ d_1 \\ d_2 \end{bmatrix} \quad (7)$$

where $d_1$ and $d_2$ are the derivatives at $Q_1$ and $Q_2$, respectively. These derivatives are not specified, and it is undesirable to derive them explicitly because they are of similarly high dimension as the poses themselves. Instead the derivatives are expressed in terms of the given poses and a set of coefficients:

$$B * \begin{bmatrix} Q_0 \\ Q_1 \\ Q_2 \\ Q_3 \end{bmatrix} = H * \begin{bmatrix} Q_1 \\ Q_2 \\ (a_1, b_1, c_1) \cdot (Q_0, Q_1, Q_2 \quad) \\ (a_2, b_2, c_2) \cdot (\quad Q_1, Q_2, Q_3) \end{bmatrix} \quad (8)$$

Note that the coefficients define $d_1$ in terms of $Q_0$, $Q_1$, and $Q_2$, and $d_2$ in terms of $Q_1$, $Q_2$, and $Q_3$, which is a common practice. As can be seen in Eq. 8, the coefficients of key shape $Q_1$ control the influence or contribution of key shapes $Q_0$, $Q_1$, and $Q_2$, and the coefficients of key shape $Q_2$ control the influence or contribution of key shapes $Q_1$, $Q_2$, and $Q_3$ to the inbetween shapes.

Rather than using fixed values for these coefficients, as in the case of most standard interpolation schemes, in the present invention the sets of shape parameters $BTB_1$ and $BTB_2$ are used to determine the coefficients, to provide additional flexibility in a way that intuitively affects these derivatives. In one embodiment of the present invention, the coefficients are written in terms of the shape parameters as $$a_1 = Tension_1 * (1.0 + Bias_1) * (Balance_1 - 1.0)/2.0$$

$$b_1 = -Tension_1 * (1.0 + Bias_1) * Balance_1$$

$$c_1 = Tension_1 * (1.0 + Bias_1) * (Balance_1 + 1.0)/2.0 \quad (9)$$

$$a_2 = Tension_2 * (1.0 - Bias_2) * (Balance_2 - 1.0)/2.0$$

$$b_2 = -Tension_2 * (1.0 - Bias_2) * Balance_2$$

$$c_2 = Tension_2 * (1.0 - Bias_2) * (Balance_2 + 1.0)/2.0$$

While these sets of coefficients define the tangent vectors at the ends of the sequence between poses $Q_1$ and $Q_2$, it is instructive to see the sets of coefficients for the incoming and outgoing tangents at particular pose $P_i$. Denoting the coefficients of the incoming tangent vector as $a_{IN}$, $b_{IN}$, $c_{IN}$ and the outgoing tangent vector as $a_{OUT}$, $b_{OUT}$, $c_{OUT}$, the shape parameters $BTB_i$ yield the following coefficients:

$$a_{IN} = Tension_i * (1.0 - Bias_i) * (Balance_i - 1.0)/2.0$$

$$b_{IN} = -Tension_i * (1.0 - Bias_i) * Balance_i$$

$$c_{IN} = Tension_i * (1.0 - Bias_i) * (Balance_i + 1.0)/2.0 \quad (10)$$

$$a_{OUT} = Tension_i * (1.0 + Bias_i) * (Balance_i - 1.0)/2.0$$

$$b_{OUT} = -Tension_i * (1.0 + Bias_i) * Balance_i$$

$$c_{OUT} = Tension_i * (1.0 + Bias_i) * (Balance_i + 1.0)/2.0$$

These equations clearly illustrate the scaling of the magnitudes of both vectors by the tension parameter, the asymmetric scaling (relative magnitude) by the bias parameter, and the directional affects of the balance parameter. The ability to independently control the direction of the derivative with the balance shape parameter provides significant advantages over conventional curve types, which only provide tension and bias like parameters that inadvertently affect direction. In accordance with the principles of the present invention to provide independent control of the direction, absolute, and relative magnitudes of the tangent vectors, other equations for the coefficients may also be used.

Using these coefficients the Hermite form can be re-expressed as $$\begin{bmatrix} Q_1 \\ Q_2 \\ (a_1, b_1, c_1) \cdot (Q_0, Q_1, Q_2 \quad) \\ (a_2, b_2, c_2) \cdot (\quad Q_1, Q_2, Q_3) \end{bmatrix} = \begin{bmatrix} 0 & 1 & 0 & 0 \\ 0 & 0 & 1 & 0 \\ a_1 & b_1 & c_1 & 0 \\ 0 & a_2 & b_2 & c_2 \end{bmatrix} * \begin{bmatrix} Q_0 \\ Q_1 \\ Q_2 \\ Q_3 \end{bmatrix} \quad (11)$$

which results in the basis matrix B in terms of the coefficients:

$$B = H * \begin{bmatrix} 0 & 1 & 0 & 0 \\ 0 & 0 & 1 & 0 \\ a_1 & b_1 & c_1 & 0 \\ 0 & a_2 & b_2 & c_2 \end{bmatrix} \quad (12)$$

Because matrix B is dependent only on the two sets of shape parameters, $BTB_1$ and $BTB_2$, this matrix is not dependent on the key shapes in any way and can therefore be applied to a set of shapes of any dimension. This eliminates the need, found in conventional systems, to separately define interpolation curves for every point of the geometric model, and thus provides considerable memory savings over conventional approaches.

Once the basis matrix B (FIG. 8, 816) is established, the set of weights $\{w_0, w_1, w_2, w_3\}$ is computed 818 using the time relationship parameter u and basis matrix B:

$$[w_0 \ w_1 \ w_2 \ w_3] = [u^3 \ u^2 \ u \ 1] * B \quad (13)$$

It is these last equations Eq. 12, and 13 that are used each time a set of weights 724 for an interpolated shape needs to be computed 722.

The derivation of the basis matrix B has been described above in terms of the Hermite representation and derivatives to more clearly illustrate the role of is the shape parameters on the interpolation curve. It should be noted that since the weights are functions of u and the basis matrix B, which is defined in terms of $BTB_1$ and $BTB_2$, then the weights themselves are functions of u and $BTB_1$ and $BTB_2$. Thus, the basis matrix B is computed directly using Eq. 12 from the shape parameters BTB (to determine the coefficients $a_i$, $b_i$, and $c_i$,) and Hermite matrix H. More explicit and more efficient functions can therefore be written for the weights in terms of u and the shape parameters.

Note also that changes to the numeric ranges of the shape parameters, or slight changes in their behavior will affect the formulas for $a_i$, $b_i$, and $c_i$ described above. For example, an alternative embodiment of the invention may chose to have an infinite range on bias, and use it to change the magnitude of only one of the incoming or outgoing derivative according to the sign of the bias value. Such changes are straightforward. It is expected that various other effects may be applied in conjunction with the shape interpolation techniques of the present invention.

In summary, the present invention provides a useful and intuitive method, apparatus, and software product for determining interpolated shapes in computer animation sequences constructed from three-dimensional geometrical models. The present invention provides three independent parameters from controlling an interpolation curve defining the inbetween shapes of several key poses. The shape parameters of bias, tension, and balance enable the animator to easily and efficiently adjust any number of inbetween shapes without excessive labor or system memory or computational requirements.

I claim:

1. In a computer assisted animation system for generating an animation sequence including a plurality of key shapes and inbetween shapes, each shape being a geometric model defined by a plurality of points, the inbetween shapes determined by an interpolation curve with respect to the key shapes, a method for interpolating the inbetween shapes of the animation sequence comprising:

receiving a plurality of key shapes for interpolating inbetween shapes between the key shapes;

receiving, for each key shape, shape parameters for independently controlling a direction, absolute magnitude, and relative magnitude of inbound and outbound tangent vectors to a single interpolation curve at the key shape; and interpolating the inbetween shapes between two key shapes as a function of the defined key shapes, the interpolation curve, and the independent shape parameters of the two key shapes wherein the interpolated inbetween shapes are to be included in the animation sequence.

2. In a computer assisted animation system for generating computer animations of geometric models over time between shapes, each shape being a geometric model defined by a plurality of points, and for any interpolation curve defined to interpolate the shape, there is an inbound tangent vector and an outbound tangent vector to the curve implicitly associated with the shape, a method of interpolating a shape $S_n$ of a geometrical model at a time T, comprising:

receiving a first input selecting a first shape $Q_1$ at Time $T_1$, the first shape $Q_1$;

receiving a second input selecting a second shape $Q_2$ at time $T_2$, where $T_1 < T < T_2$;

for each of the first and second shapes:

establishing a balance parameter that only adjusts a direction of the tangent vectors;

establishing a bias parameter that only adjusts the relative magnitudes of the tangent vectors;

establishing a tension parameter that only adjusts the absolute magnitude of the tangent vectors; and determining for the shape $S_n$ at time $T_n$ the location of all points of the shape as a function of the first and second shapes and the parameters of the first and second shapes wherein the shape $S_n$ is to be included in an animation sequence.

3. In a computer assisted animation system for generating computer animations of geometric models over time between shapes, each shape being a geometric model defined by a plurality of points, a method of generating an interpolating curve between a beginning point and an ending point, comprising:

selecting the beginning point and an end point, cach each point implicitly associated with an inbound tangent vector and an outbound tangent vector, each tangent vector having a direction, an absolute magnitude, and a relative magnitude to the other tangent vector;

establishing for the beginning point independent parameters for the direction, absolute magnitude, and relative magnitude of its tangent vectors;

establishing for the end point independent parameters fat the direction, absolute magnitude, and relative magnitude of its tangent vectors; and determining as a function of the parameters of the outbound vector the beginning point, and the parameters of the inbound tangent vector of the end point an interpolation curve between the points;

generating inbetween shapes between two key shapes responsive to the determined interpolation curve wherein the inbetween shapes are to be included in an animation sequence.

4. In a computer assisted animation system for generating computer animations of geometric models over time between shapes, each shape being a geometric model defined by a plurality of points, a method of interpolating a shape $S_n$, of a geometrical model at a time $T_n$, comprising:

defining shapes $Q_0$, $Q_1$, $Q_2$ and $Q_3$ at times $T_0$, $T_1$, $T_2$ and $T_3$ where $T_1<T_n<T_2$ respectively, each shape implicitly associated with an inbound tangent vector and an outbound tangent vector, each tangent vector having a direction, an absolute magnitude, and a relative magnitude to the other tangent vector;

establishing for shape $Q_1$ independent shape parameters for the direction, absolute magnitude, and relative magnitude of its tangent vectors;

establishing for the shape $Q_2$ independent shape parameters for the direction, absolute magnitude, and relative magnitude of its tangent vectors;

determining a time relationship parameter u as a function of $T_n$ in the interval between $T_1$ and $T_2$;

determining a set of weights $w_0$, $w_1$, $w_2$, and $w_3$ as a function of the shapes $Q_1$ and $Q_2$, and the shape parameters of shape $Q_1$, and the shape parameters of shape $Q_2$; and determining the shape $S_n$ as the weighted average;

$$S_n = w_0 Q_0 + w_1 Q_1 + w_2 Q_2 w_3 Q_3$$

wherein the shape $S_n$ is to be included in an animation sequence.

5. The method of claim 4, wherein:

the independent shape parameters for the direction, absolute magnitude, and relative magnitude of the tangent vectors of shape $Q_1$ are respectively $Balance_1$, $Tension_1$, and $Bias_1$, and the independent shape parameters for the direction, absolute magnitude, and relative magnitude of the tangent vectors of shape $Q_2$ are respectively $Balance_2$, $Tension_2$, and $Bias_2$; and, determining a set of weights $w_0$, $w_1$, $w_2$, and $w_3$ as a function of the shape parameters of shape $Q_1$, and the shape parameters of shape $Q_2$ comprises:

determining the set of weights as:

$$[w_0\ w_1\ w_2\ w_3] = [u^3\ u^2\ u\ 1] * B$$

where:

$$B = H * \begin{bmatrix} 0 & 1 & 0 & 0 \\ 0 & 0 & 1 & 0 \\ a_1 & b_1 & c_1 & 0 \\ 0 & a_2 & b_2 & c_2 \end{bmatrix}$$

H is the cubic Hermite interpolation basis; and, $a_1 = Tension_1 * (1.0 + Bias_1) * (Balance_1 - 1.0)/2.0$ $b_1 = -Tension_1 * (1.0 + Bias_1) * Balance_1$ $c_1 = Tension_1 * (1.0 + Bias_1) * (Balance_1 + 1.0)/2.0$ $a_2 = Tension_2 * (1.0 - Bias_2) * (Balance_2 - 1.0)/2.0$ $b_2 = -Tension_2 * (1.0 - Bias_2) * Balance_2$ $c_2 = Tension_2 * (1.0 - Bias_2) * (Balance_2 + 1.0)/2.0$.

6. In a computer assisted animation system, including a processor for generating an animation sequence including a plurality of key shapes and inbetween shapes, each shape being a geometric model defined by a plurality of points, the inbetween shapes determined by a parametric interpolation curve with respect to the key shapes, a software product, stored on a computer readable memory and controlling and configuring a processor to perform the steps of:

receiving a plurality of key shapes for interpolating inbetween shapes between the key shapes;

receiving, for each key shape, independent shape parameters for controlling a direction, absolute magnitude, and relative magnitude of tangent vectors to an interpolation curve at the key shape; and interpolating the inbetween shapes between two key shapes as a function of the defined key shapes and the independent shape parameters of the two key shapes wherein the interpolated shapes are to be included in the amination sequences.

7. The software product of claim 6, wherein:

receiving a plurality of key shapes for interpolating inbetween shapes between the key shapes comprises:

receiving key shapes $Q_0$, $Q_1$, $Q_2$ and $Q_3$ at times $T_0$, $T_1$, $T_2$ and $T_3$ where $T_1<T_n<T_2$ respectively; and determining a time relationship parameter u as a function of $T_n$ relative to the interval between $T_1$ and $T_2$;

receiving, for each key shape, independent shape parameters comprises:

receiving for key shape $Q_1$ the independent shape parameters of $Balance_1$, $Tension_1$, and $Bias_1$ for the direction, absolute magnitude, and relative magnitude, respectively, of the tangent vectors of shape $Q_1$ to the interpolation curve receiving for key shape $Q_2$ the independent shape parameters of $Balance_2$, $Tension_2$, and $Bias_2$ for the direction, absolute magnitude, and relative magnitude, respectively, of the tangent vectors of shape $Q_2$ to the interpolation curve;

interpolating the inbetween shapes between two key shapes as a function of the defined key shapes and the independent shape parameters of the two key shapes comprises:

computing each inbetween shape using a Hermite form polynomial curve as a function of the key shapes $Q_0$, $Q_1$, $Q_2$ and $Q_3$ and coefficients $a_1$, $b_1$, $c_1$, and $a_2$, $b_2$, $c_2$, where:

$a_1 = Tension_1 * (1.0 + Bias_1) * (Balance_1 - 1.0)/2.0$ $b_1 = -Tension_1 * (1.0 + Bias_1) * Balance_1$ $c_1 = Tension_1 * (1.0 + Bias_1) * (Balance_1 + 1.0)/2.0$ $a_2 = Tension_2 * (1.0 - Bias_2) * (Balance_2 - 1.0)/2.0$ $b_2 = -Tension_2 * (1.0 - Bias_2) * Balance_2$ $c_2 = Tension_2 * (1.0 - Bias_2) * (Balance_2 + 1.0)/2.0$.

8. In a computer assisted animation system for generating an animation sequence including at least two key shapes, and at least one inbetween shape, each shape being a geometric model defined by a plurality of points, the inbetween shape determined by an interpolation curve with respect to the key shapes, a method for interpolating the inbetween shape of the animation sequence comprising:

receiving, for a first key shape, independent shape parameters for controlling a direction, absolute magnitude, and relative magnitude of inbound and outbound tangent vectors to an interpolation curve at the first key shape;

receiving, for a second key shape, independent shape parameters for controlling a direction, absolute magnitude, and relative magnitude of inbound and outbound tangent vectors to the interpolation curve at the second key shape; and interpolating the at least one inbetween shape between the first and second key shapes as a function of the first and second key shapes, the interpolation curve, and the independent shape parameters of the first and second key shapes wherein the at least one interpolated inbetween shape is to be included in the animation sequence.

9. An animation sequence including a plurality of images of shapes, including key shapes and inbetween shapes, the animation sequence produced by the process of:

generating a first image including at least a first key shape;

receiving, for the first key shape, independent shape parameters for controlling a direction, absolute magnitude, and relative magnitude of inbound and outbound tangent vectors to an interpolation curve at the first key shape;

generating a second image subsequent to the first image and including at least one second key shape;

receiving, for the second key shape, independent shape parameters for controlling a direction, absolute magnitude, and relative magnitude of inbound and outbound tangent vectors to the interpolation curve at the second key shape; and generating at least one image between the first and second images, and including at least one inbetween shape by interpolating the at least one inbetween shape between the first and second key shapes as a function of the first and second key shapes, the interpolation curve, and the independent shape parameters of the first and second key shapes wherein the generated Images are to be included in the animation sequence.

10. In a computer assisted animation system for generating an animation sequence including a plurality of key shapes and inbetween shapes, each shape being a geometric model defined by a plurality of points, the inbetween shapes determined by an interpolation curve with respect to the key shapes, an apparatus for interpolating the inbetween shapes of the animation sequence comprising:

means for receiving a plurality of key shapes for interpolating inbetween shapes between the key shapes;

means for receiving, for each key shape, independent shape parameters for controlling a direction, absolute magnitude, and relative magnitude of inbound and outbound tangent vectors to an interpolation curve at the key shape; and means for interpolating the inbetween shapes between two key shapes as a function of the defined key shapes, the interpolation curve, and the independent shape parameters of the two key shapes wherein the interpolated inbetween shapes are to be included in the animation sequence.

11. A computer assisted animation system for generating an animation sequence including a plurality of key shapes and inbetween shapes, each shape being a geometric model defined by a plurality of points, the inbetween shapes determined by an interpolation curve with respect to the key shapes, the system for interpolating the inbetween shapes of the animation sequence comprising:

an input device, for allowing the specification of independent shape parameters including direction, absolute magnitude, and relative magnitude parameters;

memory for storing instructions on interpolating inbetween shapes as a function of inbound and outbound tangent vectors to an interpolation curve at key shapes through the specification of the independent shape parameters of the tangent vectors; and a processor, coupled to the input device, for receiving the independent shape parameters, receiving a plurality of key shapes, and interpolating inbetween shapes in accordance with the instructions stored in memory wherein the interpolated inbetween shapes are to be included in the animation sequence.

12. A method of generating a frame of animation in an animation sequence comprising the steps of:

receiving two key shapes, a first key shape to be displayed prior in time to the second key shape;

receiving, for each key shape, independent shape parameters for controlling a direction, absolute magnitude, and relative magnitude of inbound and outbound tangent vectors to an interpolation curve at the key shape; and interpolating an inbetween shape to display as a frame in an animation sequence as a function of the defined key shapes, the interpolation curve, and the independent shape parameters of the two key shapes.

* * * * *

UNITED STATES PATENT AND TRADEMARK OFFICE
CERTIFICATE OF CORRECTION

PATENT NO. : 6,108,011
DATED : August 22, 2000
INVENTOR(S) : Barry M. Fowler

It is certified that error appears in the above-identified patent and that said Letters Patent is hereby corrected as shown below:

Column 14,
Line 44, after "point," delete "cach".
Line 52, delete "fat" and insert -- for --.

Column 15,
Line 22, after "$Q_2$" and before "$W_3$" insert -- + --.

Column 17,
Line 31, delete "Images" and insert -- images --.

Signed and Sealed this

Second Day of April, 2002

Attest:

*Attesting Officer*

JAMES E. ROGAN
*Director of the United States Patent and Trademark Office*